US010046918B2

(12) United States Patent
Da Silva et al.

(10) Patent No.: US 10,046,918 B2
(45) Date of Patent: Aug. 14, 2018

(54) CONTINUOUS BELT CONVEYOR MONITORING SYSTEMS AND METHODS

(71) Applicant: Embraer S.A., São José dos Campos-SP (BR)

(72) Inventors: Paulo Anchieta Da Silva, São José dos Campos (BR); Ricardo Pinheiro Rulli, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 15/337,965

(22) Filed: Oct. 28, 2016

(65) Prior Publication Data

US 2018/0118470 A1    May 3, 2018

(51) Int. Cl.
*B65G 43/00* (2006.01)
*B65G 43/02* (2006.01)
*B65G 15/36* (2006.01)

(52) U.S. Cl.
CPC .......... *B65G 43/02* (2013.01); *B65G 15/36* (2013.01); *B65G 2203/0275* (2013.01); *B65G 2203/041* (2013.01)

(58) Field of Classification Search
CPC .................................................. B65G 43/02

USPC ............. 198/502.2, 502.3, 810.01, 810.02
See application file for complete search history.

(56) References Cited

U.S. PATENT DOCUMENTS

| | | | |
|---|---|---|---|
| 7,316,251 B2 * | 1/2008 | Kogure .............. | B60C 23/20 152/152.1 |
| 7,427,767 B2 * | 9/2008 | Kemp ................ | B65G 43/02 198/502.1 |

\* cited by examiner

*Primary Examiner* — Gene O Crawford
*Assistant Examiner* — Lester Rushin, III
(74) *Attorney, Agent, or Firm* — Nixon & Vanderhye P.C.

(57) ABSTRACT

An online real-time method of measuring the thickness of a moving belt uses infrared thermography technology to continuously and noninvasively measure the thickness of rubber cover regions and detect damage. This technique solves technical problems and realizes potential gains such as increased efficiency in planning maintenance/replacements of conveyor belts; provides rationalizations and advanced planning for stocking spare conveyor belts; provides a lookahead of acute wear at points to avoid premature wear or belt loss; generates a history of generating wear after each belt replacement with life projections and early planning acquisitions and operational stoppages for exchange; and provides early warning system integration.

20 Claims, 4 Drawing Sheets

CONTINUOUS BELT CONVEYOR MONITORING SYSTEMS AND METHODS

CROSS-REFERENCE TO RELATED APPLICATIONS

None.

STATEMENT REGARDING FEDERALLY SPONSORED RESEARCH OR DEVELOPMENT

None.

FIELD

This technology relates to monitoring and measuring, and more particularly to noninvasive systems and methods for continuously monitoring a belt conveyor by performing a belt online thickness measurement using thermal (infrared) imaging analysis and using thermographic measurements to continuously or continually determine the thickness of a conveyor belt cover region in real time.

BACKGROUND

The belt conveyor, due to its safe, reliable operation and adaptability, has been extensively adopted by industry. Example uses include transporting raw materials and/or inputs to production processes. Belt conveyers have many applications such as mining, metallurgy, manufacturing and power production to name a few.

Like most mechanical items, conveyor belts can wear out and eventually break. Excessive wear or breakage of a conveyor belt continuously damaged can cause considerable economic loss. A severely damaged belt can damage the structural platform, the engine, motor or devices associated with it or even cause physical injuries to workers.

To make sure efficient use is made of a belt conveyor, it is possible to monitor its structural integrity by measuring and verifying the reduction of belt thickness due to wear during operation. Many such belts are reinforced with steel cords or woven fabric but rely on rubber material for structural integrity. Periodic inspection of rubber cover layers is typically made along the length of the belt by performing manual thickness measurements using an ultrasonic probe.

To perform such manual measurements, it is generally necessary to stop the belt conveyor. Such manual thickness measurements are often directed to so-called rubber "cover regions" that for example cover internal woven fabric or steel cord reinforcing elements within the belt. The techniques currently employed make point thickness measurements (e.g., from 15 to 18 points in the transverse direction of the belt every 50 or 100 meters in the longitudinal direction). The rubber cover region of the belt may for example have a nominal thickness of between 12 to 14 mm. A belt region with the most wear is likely to be the center of the belt where there is or can be charge buildup. Such manual measurements if performed periodically can often detect belt wear before failure occurs.

In more detail, FIG. 1 shows a cross-sectional view of an example steel reinforced rubber conveyor belt 10. Belt 10 includes a rubber cover region 12, a steel cord (or other reinforcement) region 14, and a rubber return region 16. In current techniques, the belt 10 is stopped and an ultrasonic sensing probe 18 is manually placed on the surface 20 of the rubber return region 16. The ultrasonic sensing probe 18 emits high frequency audio pulses which pass through the rubber cover region 12, are reflected by the steel wires region 14 within the belt, and return to the sensor 18. The sensing probe 18 or its associated equipment measures the ultrasonic pulse propagation delay time (i.e., by comparing the time the pulse was emitted to the time it returns) to determine the thickness of cover region 12. Longer delay times indicate a thicker cover region 12, while shorter delay times indicate a thinner cover region. Well known calculations based on sound propagation delay through different materials can derive a precise thickness measurement from such techniques. The ultrasonic measurement is repeated at various point positions spaced at intervals along the belt 10 to detect the thinnest part of the belt cover region 12. See for example http://www.olympus-ims.com/en/applications/thickness-testing-rubber-conveyor-belt/.

If the thickness of the rubber cover region 12 is near "zero" mm thickness (i.e., the steel cords 14 are nearly exposed), there is a risk of accidents (e.g., belt rupture) due to lower resulting belt tensile strength. Measurements are often taken periodically to determine the optimum time to stop the equipment for belt replacement. The best time to replace a belt may be at a time that minimizes the risk of rupture but seeks to maximize use of the asset.

Typically, the industry replaces a belt when the cover region 12 has worn to a thickness of 1 mm thick or less. Removing a belt having 2 or 3 mm of remaining rubber cover region 12 might mean underusing the asset. Replacing a belt more often than necessary halts the production or conveyance line a greater number of stops for exchanging belts—leading to possible impacts in production objectives and efficiency, depending on when replacement occurs.

Improved efficacy in predicting the time to stop and measure and/or replace the belt, and better measurement accuracy, can lead to decreased cost impact on the industry and other advantages.

BRIEF DESCRIPTION OF THE DRAWINGS

The following detailed description of exemplary non-limiting illustrative embodiments is to be read with the drawings of which.

DETAILED DESCRIPTION OF NON-LIMITING EMBODIMENTS

Figure 1:
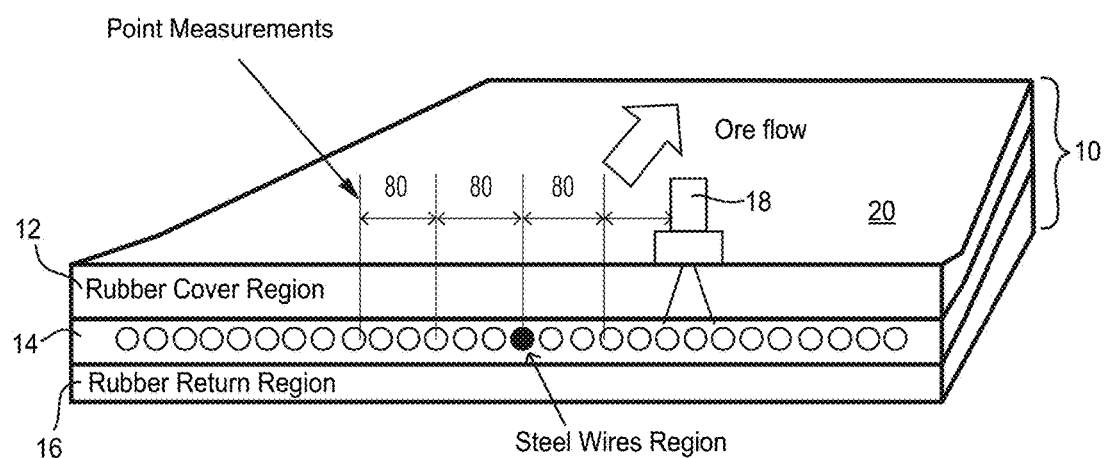
FIG. 1 is a cross-sectional view of an example non-limiting prior art conveyor belt structure being measured using ultrasonic point measurements. The belt is divided into 3 regions: rubber cover region; steel wire reinforcement region and rubber return region.

One belt measurement technology used in the industry is ultrasound. Manual measurements using ultrasound are typically downloaded to a computer and plotted using software solutions developed in-house (e.g., spreadsheets) on an ad hoc basis without integrated control or other integration with production and maintenance systems.

Such ultrasound techniques are standalone and generally are not integrated into the plant controls. They rarely generate alarms in real time. Thus, they do not help to maintain or support an analyst's interpretation of the chart and belt exchange decisions for belt end of life.

Other methods that facilitate coupling these sensors in the production environment—for example, laser coupling—can be sensitive to environmental conditions such as dust accumulation. Hence, a solution is needed which emphasizes another measure favoring simplicity of the steps and robustness of the measuring apparatus.

The example non-limiting technology provides an online real-time method of measuring the thickness of rubber cover regions or other conveyor belt portions using infrared thermography technology. Such systems and methods of continuous noninvasive measurement of the thickness of rubber cover regions and damage detection on conveyor belts based on infrared thermography technology can be integrated with manufacturing processes to provide enhanced functionality, efficiency, predictive accuracy and other advantages.

The example non-limiting technology solves technical problems relating to deficiencies of prior approaches, and realizes potential gains such as increased efficiency in planning maintenance/replacements of conveyor belts; provides rationalizations and advanced planning for stocking spare conveyor belts; provides a lookahead of acute wear at points to avoid premature wear or belt loss; generates a history of generating wear after each belt replacement with life projections and early planning acquisitions and operational stoppages for exchange; provides early warning system integration; and other non-limiting advantages.

The following detailed description of embodiments refers to the figures included, which illustrate many of the main ideas behind the disclosed non-limiting embodiments. The technology may be embodied as a method, system hardware, embedded firmware and or software as a whole product or as a set of parts that work together to achieve the same goal.

Infrared Thermography

Generally, infrared thermography ("IRT") is a known technology used to measure infrared energy radiated by an object, convert the measurements to temperature, and provide a numerical and/or visual thermograph or "heat map". Such technology has been used in the past for various applications including night vision/surveillance, medical diagnosis, manufacturing defect detection, firefighting, building defect detection, and others.

Thermography can be preventive maintenance through inspection of mechanical systems, electrical systems and processes to provide technical reports indicating operational distortions and their respective corrective actions, illustrated with thermograms, thermographs and photographic records of places of excessive heat. Such techniques are extensively used with success in the electrical components industry for example to detect hot spots and other regions of overheating of manufactured electrical components.

IR Thermography Used to Measure Belt Thickness

In one example non-limiting embodiment and associated method disclosed, such thermographic measurements are used in real time to continuously or continually determine the thickness of a conveyor belt cover region.

Example Non-Limiting System

Figure 2:
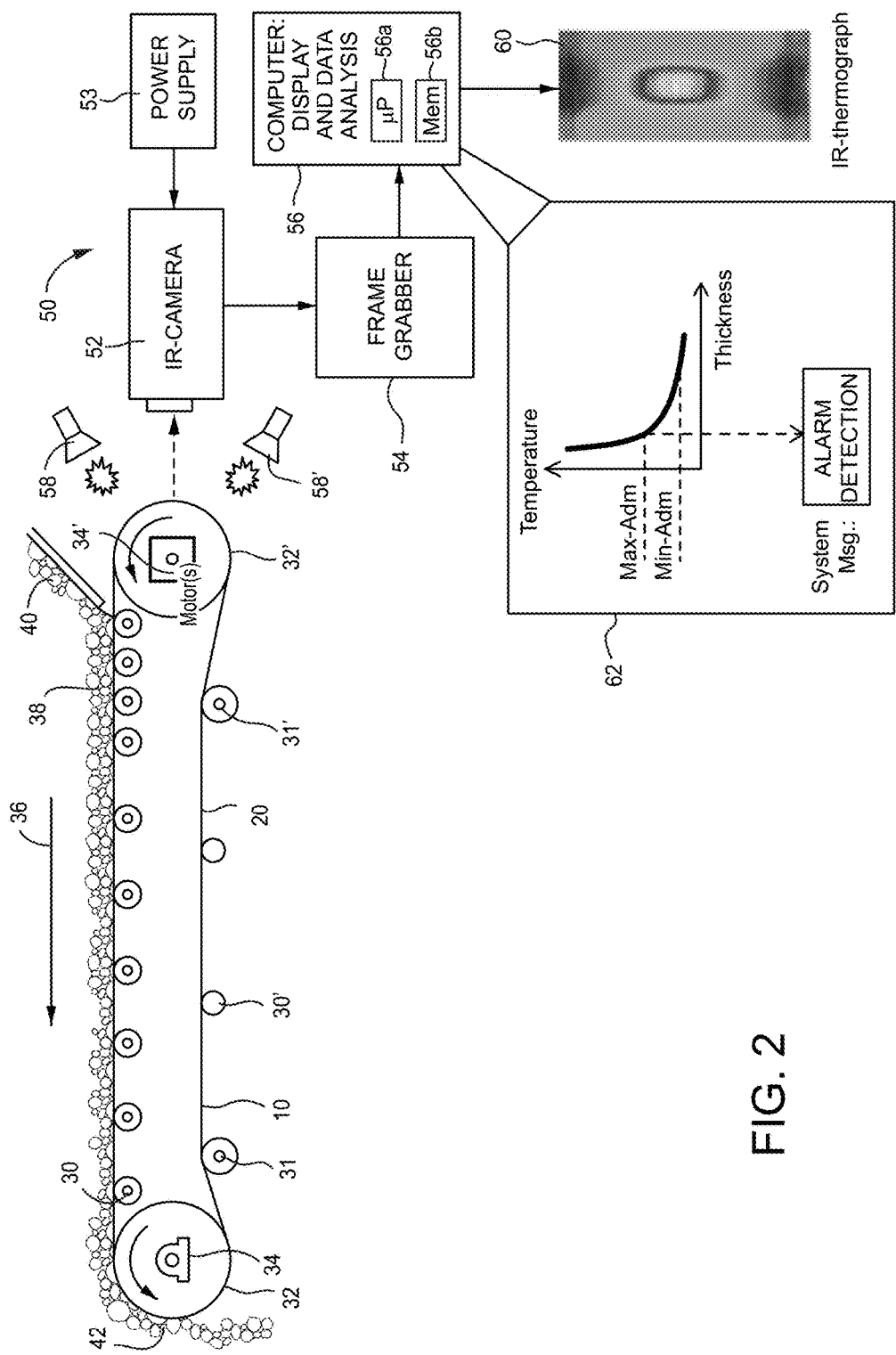
FIG. 2 shows a non-limiting example system including components and an environment in which the disclosed system and method may be used.

FIG. 2 shows an example non-limiting example system 50 including various components and an environment. FIG. 2 shows an example looped (endless) conveyor belt 10 supported by rollers (toothless idlers) 30, takeup devices 31 and toothed sprockets or drums 32. The sprockets/drums 32 are driven to rotate by motors 34 or other driving components to cause the conveyor belt 10 loop to rotate around the sprockets/drums in a transport direction 36. Motors 34 are typically equipped with shaft encoders to allow system 50 to automatically monitor both the position of belt 10 and the speed at which the belt is rotating. As belt 10 rotates, it transports material 38 from a hopper or feeder 40 to a discharge region 42 by moving in the transport direction 36 under rotating force applied by rotating sprockets/drums 32.

The example non-limiting embodiment of system 50 further includes one or more infrared emitters 58, one or more infrared (IR) cameras 52, a frame grabber 54, and a computer display and data analyzer 56. In this example non-limiting embodiment, infrared emitters 58 such as conventional IR light emitting diodes or heat radiators of selected powers, frequencies, ranges and radiation patterns emit infrared energy toward a portion of belt 10 currently wrapped around sprocket/drum 32. As the belt 10 continually moves based on rotation of the driven sprockets/drums 32, different parts of the belt are continually exposed to IR energy emitted by IR emitters 58. By the end of one complete rotation of endless belt 10, the entire belt's cover surface 20 will have been irradiated by IR emitters 58.

The belt cover surface 20 absorbs a portion of the IR energy emitted by the emitters 58 and reflects the remaining emitted IR energy back toward IR camera 52. In the example shown, a pair of emitters 58, 58' are positioned on either side of camera 52 and angled toward belt 10 so camera 52 has an unobstructed view of the belt. The camera 52 can be a conventional video type camera with an IR lens that continually captures IR images of belt 10 as the belt rotates. A frame grabber 54 of conventional design can periodically grab or store frames of video produced by the IR camera 52. The frame grabber 54 outputs the captured/stored frames one at a time to the display and data analysis computer 56 for analysis and visualization. Frame grabber 54 could be implemented by a hardware or other analysis unit that automatically analyzes captured images and outputs coordinates, size or other characteristics of regions of detected heat and cold areas with temperature/heat range.

The computer 56 can output an IR thermograph or heat map 60 (see Figure inset) that represents in two dimensions the temperature or heat distribution of the portion of belt 10 the IR camera 52 is imaging. As shown in the inset 62, temperature of belt 10 in response to IR irradiation can be expected to decrease as the belt's rubber cover region 12 thickness decreases. This is because a thicker rubber layer, being an insulator, retains (instead of conducting away) more of the heat emitted by IR emitters 58 than a thinner rubber layer. The underlying steel cords 14 within the belt 10—being conductors—will conduct the heat away from the irradiated region of the belt and will do so more efficiently if the rubber cover region 12 is thinner and less insulative. For these various reasons, as shown in the FIG. 2 inset 62, measured temperature will increase when the rubber cover region 14 is thicker, and will decrease when the rubber cover region is thinner.

Computer 56 can automatically analyze the heat map 60 to determine how hot the belt is and where it is hot. In response, as discussed below, computer 56 determines a belt cover material 12 thickness and compares it to one or more thresholds. If the determined belt thickness is less than a predetermined threshold, computer 56 can use an output interface such as displayed on a screen (stationary, mobile or portable) to alert operators that the belt must be measured and possibly replaced.

Belt 10 may be any belt including but not limited to non-reinforced rubber or rubber reinforced with steel cords, woven fabric, or other reinforcing elements. Different conveyor belt 10 structures have different temperature retaining and radiation reflecting properties and characteristics. The same belt may differ in these properties and characteristics along its length even when new. Therefore, it is useful for system 50 to capture a baseline of such measured characteristics correlated with the position of belt 10—which can be ascertained for example by shaft encoder(s) (not shown) coupled to sprockets/drums 32 to indicate the current position and speed of the belt. Or in addition, belt 10 can be marked (e.g., with retroflective paint or other markers) to enable IR camera 52 to determines the current position and speed of the belt.

Assuming belt 10 is sufficiently long and moves continuously, the IR energy the belt is exposed to while rounding sprocket 32' dissipates by the time that same portion of the belt again rounds the sprocket. The belt 10 does not heat up much overall during its operation and constant irradiation by IR emitters 58. Therefore, spot heating by the portion of the belt being irradiated by IR emitters 58 can detect the thickness of the rubber cover region 12 of that portion of the belt. Shields or baffles could direct the impinging IR radiation to a desired area size.

The example non-limiting embodiment measures the temperature response of the rubber coverage areas 14 of belt 10 to a constant/fixed amount of IR irradiation 52—which response is determined by the total intensity (lux) of the radiation from the IR radiators 58 that impinges upon the belt, the speed at which the belt 10 is moving (faster belt movement will expose any point or region on the belt to less IR radiation per belt revolution because the portion upon which radiation impinges is in the range of the IR emitters 58 for a shorter period of time), and the temperature retaining/reflecting characteristics of that given point or region of the belt.

Such measurements can be performed even when, as shown in FIG. 2, the belt 10 is actively being used to carry materials from the inlet 40 to the outlet 42. The IR radiators 58 and camera 52 can be directed to any portion of belt 10 not obstructed by such material—including for example the underside of the belt.

The system 50 in the example non-limiting system of FIG. 2 further includes a computer 56 capable of generating, recording and evaluating thermal images of the belt conveyor 10. Computer 56 has a computational processor 56a and mathematician algorithms stored in non-transitory memory 56b with the ability to detect damage and measure the thickness of the rubber cover region 12 to perform integrity monitoring and management of the belt conveyor 10.

The above solution is relatively simple, does not interfere with how any vendor or user is using the belt enabling specific vendor independence for the same, can be free of the need for calibrations that require laboratories or qualified external means, can show relative independence from typical harsh conditions of the production environment in the target industry if thermal discontinuity levels are well identified on the border of the problem and, above all sees no impediments to a mobile solution reused in each production courtyard.

Example Non-Limiting Processing and Analysis

Figure 3:
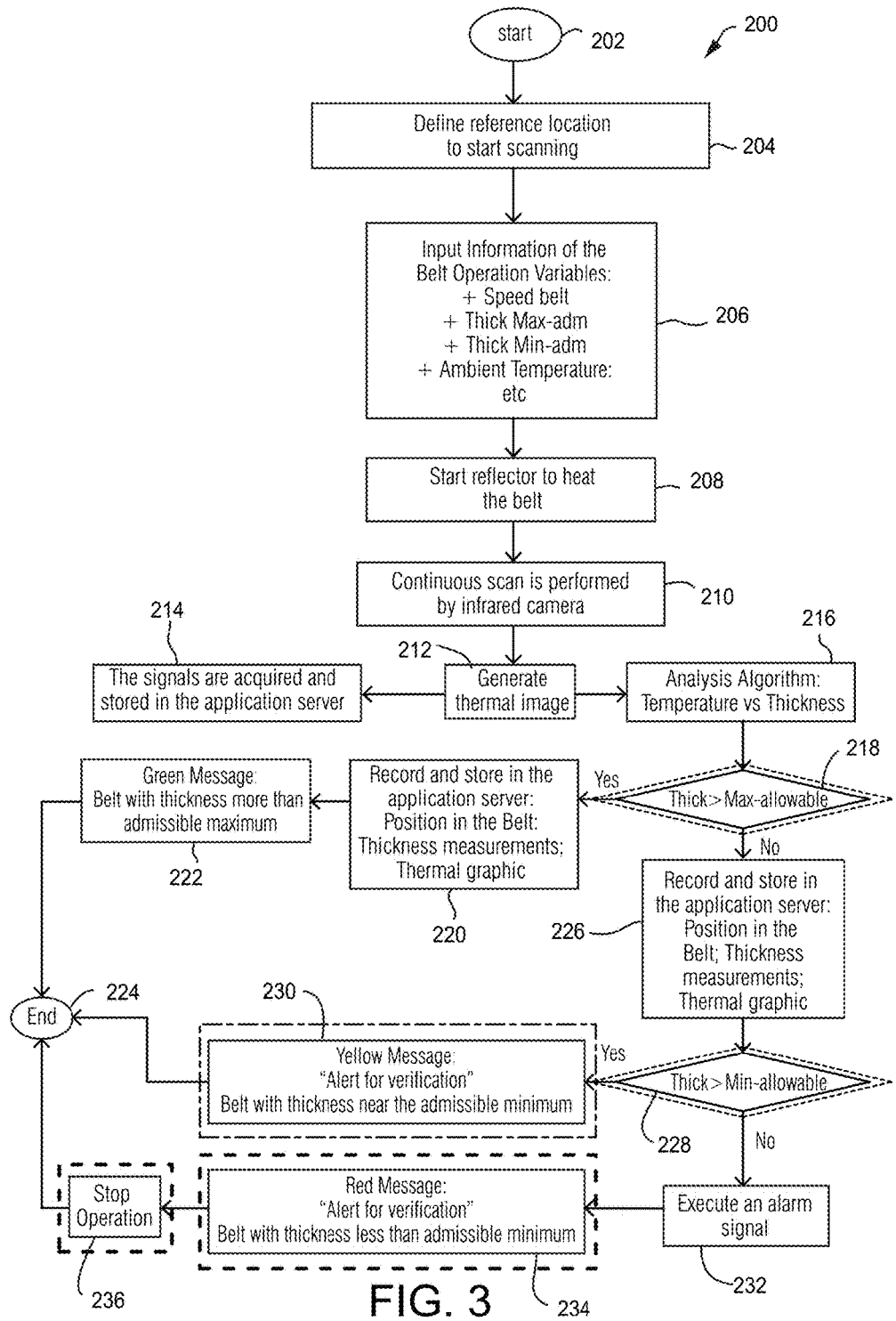
FIG. 3 shows a non-limiting example process flow chart implemented by a hardware processor for performing non-invasive diagnostics.

FIG. 3 is an example non-limiting flowchart of a system 50 and associated method to perform a non-invasive diagnostics of the structural integrity of a conveyor belt 10 under for example software control with the software instructions being stored in non-transitory memory 56b and executed by microprocessor 56a.

As the "start" step of the method, it has already been assumed that an infrared camera 52 is installed near to belt return drum 32 and which will be capable of doing a scan of the rubber cover region 12 of the belt 10 and recording these images. A set of emitters 58 is installed in front of the belt return drum, to generate heat in the rubber cover region. Also an application server 56 is installed which will be capable of storing the acquired signals of the infrared camera 52, of the "zero referential point" used to define the localization of the events and other variables for thermography image and analysis. A power supply 53 is provided. Also, software is installed in the application server 56 memory 56b (called "User's interface SW"), and is executed by processor 56a to receive interface commands in the display of a video monitor for the maintenance staff interact with the system.

Also the maintenance staff defines in the "User's interface SW" a reference point "zero" to generate a referential heat map of the events (block 204). The maintenance staff inputs information of the belt 10 operation variables: Speed belt, Humidity, Brightness, environment Temperature, Thickness Maximum allowable, Thickness Minimum allowable, etc. (block 206). The maintenance staff starts in the "User's interface SW" the emitter device 58 to heat the belt (block 208).

Figure 4:
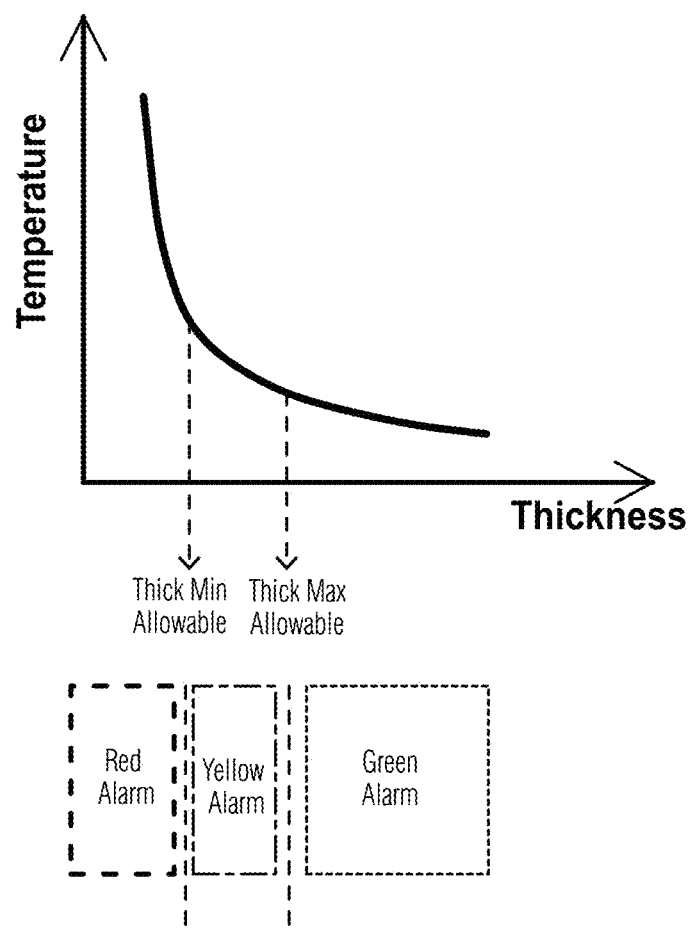
FIG. 4 shows non-limiting example relation between Temperature vs Thickness and Alarms.

A continuous scan is performed by infrared camera 52 in the rubber cover region 12 of the belt (block 210). In response, computer 56 generates a thermal image (block 212). The IR camera signals are then acquired (e.g., by frame grabber 54) and stored in the application server (block 214). In step 216 of the method, it has already been assumed that a software (herein called "Diagnostic SW") is installed in the application server 56 and which will be capable of executing the analyses of the complex thermal images of a belt and measure the thickness of rubber cover regions to do a diagnostic of the structural integrity state. The diagnostic SW promotes the execution of several algorithms to perform a mathematical analysis: Analysis Algorithm: Temperature vs Thickness (see FIG. 4) (block 216). One example non-limiting implementation captures a baseline temperature profile for the entire belt and then compares the current temperature of a certain position on the moving belt with the baseline temperature for that same position on the belt while compensating for ambient temperature and belt speed. Meanwhile, FIG. 4 shows an exponential curve with a relatively linear portion between minimum and maximum allowable thickness, enabling the processor 56a to calculate linear or second order equations to derive belt cover region thickness from measured temperature.

If the thickness of rubber cover obtained by thermography analysis is higher that Thickness maximum allowable ("yes" exit to decision box 218), then computer 56 records and stores in the application server:
  Position of the Belt (determined by a shaft encoder for example);
  Thickness measurements;
  Thermal graphic;
  Green Message: Belt with thickness more than admissible maximum (block 222).

If thickness does not exceed the maximum allowable specification (i.e., wear is evident), then example 56 records and stores in the application server:
  Position in the Belt;
  Thickness measurements;
  Thermal graphic.

If the thickness of the rubber cover 12 obtained by thermography analysis is less than or equal to a Thickness maximum allowable and higher than Thickness minimum allowable ("yes" exit to decision block 228), then computer 56 records and stores in the application server:

Yellow Message: "Alarm for verification" Belt with thickness near the admissible minimum.

If the thickness of rubber cover 12 obtained by thermography analysis is less than or equal to Thickness minimum allowable ("no" exit to decision block 232) then computer 56 records and stores in the application server and automatically stops operation (block 236):

Red Message: "Alarm for verification" Belt with thickness less than admissible minimum (block 234).

Then is finalized the process (block 224) and the User's interface SW sends a report with the data analysis and results and appears in the display of a video or other monitor with additional a MSG indicating: "Operation completed". The FIG. 3 routine can run repeatedly at intervals such as once every hour the conveyor 10 is in operation. These techniques can be used with the manual ultrasonic measurement techniques discussed above so that when block 230 or 234 detects a potential problem, an operator can use an ultrasonic probe to measure belt thickness using another method.

While the invention has been described with what is presently considered the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system for monitoring a conveyor belt comprising:
    (a) acquiring an infrared image of a conveyor belt;
    (b) using at least one processor, analyzing the acquired infrared image to detect temperature and/or heat; and
    (c) using the at least one processor, determining the thickness of a rubber cover region of the belt based at least in part on the analysis.

2. The system of claim 1 further including continually moving the conveyor belt while performing at least (a).

3. The system of claim 1 further including comparing the determined thickness to a baseline and generating a real time alert if the determined thickness is less than a predetermined thickness.

4. The system of claim 1 further including irradiating portions of the belt with an infrared source and wherein the acquiring comprises acquiring images of the irradiated portions.

5. The system of claim 1 further including comparing the determined thickness to a baseline.

6. The system of claim 1 wherein the analysis comprises determining the heat response of the rubber cover region to short-term exposure to an infrared source.

7. The system of claim 1 wherein the belt is reinforced.

8. The system of claim 1 further including monitoring position of the belt as the belt moves and correlating detected temperature and/or heat to belt position.

9. A method of monitoring the condition of a moving belt comprising:
    (a) continually moving the belt;
    (b) irradiating a fixed portion of the path of the moving belt with infrared radiation;
    (c) imaging infrared radiation reflected by the moving belt as the belt moves through the fixed portion of the path;
    (d) obtaining a thermal image from the imaging;
    (e) using at least one processor, determining, from the obtained thermal image, whether at least a rubber cover region of the moving belt exhibits a thickness that is less than a predetermined minimum acceptable thickness; and
    (f) conditioning a real time alarm on results of the determining.

10. The method of claim 9 wherein the determining determines from the obtained thermal image whether the rubber cover region of the moving belt exhibits a thickness that is less than the predetermined minimum acceptable thickness.

11. The method of claim 9 wherein the determining comprises comparing characteristics of the obtained thermal image with a baseline.

12. The method of claim 9 wherein the determining accounts for belt position.

13. The method of claim 9 wherein the determining accounts for belt speed.

14. The method of claim 9 wherein the determining accounts for ambient temperature.

15. The method of claim 9 further including tracking the position of the moving belt and correlating the obtained thermal image with belt position.

16. The method of claim 9 wherein the imaging comprises capturing an infrared video image with an infrared camera.

17. The method of claim 9 wherein the obtained thermal image comprises a heat map.

18. The method of claim 9 wherein the conditioning selectively generates a first alarm indicating the belt rubber cover region has a thickness near an admissible minimum and a second alarm indicating the belt rubber cover region has a thickness less than the admissible minimum.

19. The method of claim 9 further including automatically stopping the belt from moving in response to results of the determining.

20. The method of claim 9 wherein the determining measures the temperature response of the rubber cover region of the belt to a constant/fixed amount of infrared irradiation, which response is determined by the total intensity of the radiation that impinges upon the belt, the speed at which the belt is moving and the temperature retaining/reflecting characteristics of the belt.

* * * * *